United States Patent [19]

Thomas, Jr.

[11] Patent Number: 5,104,177
[45] Date of Patent: Apr. 14, 1992

[54] CAP FOR CONVERSION VAN

[75] Inventor: Paul Thomas, Jr., Daleville, Ala.

[73] Assignee: VMC Fiberglass Products, Inc., Daleville, Ala.

[21] Appl. No.: 633,383

[22] Filed: Dec. 31, 1990

[51] Int. Cl.⁵ .......................................... B62D 25/06
[52] U.S. Cl. .................................. 296/210; 296/164
[58] Field of Search ............... 296/210, 213, 214, 164, 296/102, 104, 211, 901

[56] References Cited

U.S. PATENT DOCUMENTS

| | | | |
|---|---|---|---|
| 2,191,264 | 2/1940 | Werner | 296/210 |
| 3,475,048 | 10/1969 | McNamee | 296/164 |
| 4,119,749 | 10/1978 | Roth et al. | 296/210 X |
| 4,475,765 | 10/1984 | Vogt et al. | 296/210 |
| 4,569,554 | 2/1986 | Dodgen | 296/102 X |
| 4,575,148 | 3/1986 | Bieber | 296/210 |
| 4,705,716 | 11/1987 | Tang | 296/901 X |
| 4,837,914 | 6/1989 | Borum et al. | 296/210 X |

FOREIGN PATENT DOCUMENTS

| | | | |
|---|---|---|---|
| 1205103 | 5/1986 | Canada | 296/164 |
| 2611637 | 9/1988 | France | 296/210 |

Primary Examiner—Margaret A. Focarino
Assistant Examiner—Joseph D. Pape
Attorney, Agent, or Firm—Jones, Askew & Lunsford

[57] ABSTRACT

A cap having a roof member, depending sides and an open bottom to define a shell-like closure for a conversion van. The roof member includes a plurality of honeycomb-like panels disposed between longitudinally disposed cleats. Layers of fiberglass cloth and resin secure the panels and cleats together in the cap. A plurality of transverse support members defining a general U-shape connect to the cap on the interior.

6 Claims, 3 Drawing Sheets

CAP FOR CONVERSION VAN

TECHNICAL FIELD

The present invention relates generally to a cap for vehicles. More particularly, the present invention relates to a reinforced cap for mating engagement to a van converted for recreational use.

BACKGROUND OF THE INVENTION

The motor vehicle industry has provided in recent years a number of new type of vehicles which respond to the changing needs of consumers. One type of such new vehiclel is a van which is useful for recreation and comfortable travel on the road. Such vans are converted into recreational vans by the addition of a number of features. The features include carpeted side walls and ceiling, special bucket seats and seats which are convertible for sleeping, tables, and other equipment including improved stereo systems, televisions, video recorders, lights and the like. Such a van is generally known as a "conversion van" because of the manufacturing process required to change the standard van into a recreational vehicle having many of these added features. Often, these conversion vans are assembled at specialized manufacturing plants which process standard massmanufactured van bodies and frames.

Typically, such conversion vans include a raised roof, known as a cap, having a generally aerodynamic roof line and sloping sides. Some roofs have one portion raised higher than another. The portions are interconnected by a sloping, forward-facing panel. The sloping sides, and particularly the sloping forward panels, may include windows. A number of ornamental styles and designs are known.

The caps typically are formed in molds with fiberglass and resin materials. The caps are shells having a roof, depending sides and an open bottom. Many known caps are made from honeycomb-like paperboard which is coated with fiberglass. The resulting cap is rigid, yet lightweight.

During the manufacturing process of converting a van, the existing roof is cut-off at the roof-line, above the drip rail of the van. This leaves a small upright flange which cooperates with the drip rail to receive the conversion cap. A gasket is placed on the roof line of the van and the cap is placed on top of the gasket. A band is seated in the drip rail against the cap. The band overlaps the cap and screws are driven through the band, the cap, and the flange portion of the side wall to secure the cap to the van.

Recent changes in regulations covering motor vehicle construction, especially those promulgated by the United States Federal Government, require more secure attachment of a stronger cap to such vans to better withstand the forces which may be incurred during a collision or roll-over of the van. Some known caps and known securing methods do not satisfactorily meet these new requirements.

Thus, there exists a need in the art for a stronger cap and an improved connection of the cap to a conversion van.

SUMMARY OF THE PRESENT INVENTION

The present invention solves the needs described above by providing a cap for attachment to a metal channel defining the perimeter of an open-top vehicle at its roof line. The cap is generally described as a shell comprising a roof member, depending sides, and an open bottom to define an interior cavity. The roof member comprises a plurality of honeycomb-like paperboard panels and a plurality of longitudinally disposed, spaced-apart cleats. Each of the panels is disposed between two of the cleats. The cap also includes a plurality of transverse support members which are spaced-apart in the interior cavity of the shell. Each transverse support member is made from a transverse bar and a pair of legs. One leg depends from each end of the transverse bar to define a general U-shape support member. After the cap is installed on the open-top van, at least one transverse support bar is rigidly connected to the roof member. The free end of each leg is received by and rigidly connected to the metal channel at the upper edge of the van.

Accordingly, it is an object of the present invention to provide an improved cap for a conversion van.

It is another object of the present invention to provide a conversion van with a cap which resists deformation by forces experienced during collisions.

It is another object of the present invention to provide a conversion cap with a transverse support member for increased strength.

It is another object of the present invention to provide a conversion van with a cap which is readily installed during the manufacturing process of the converting the van.

It is another object of the present invention to provide a cap which securely connects to a conversion van.

Other objects, features and advantages of the present invention will become apparent upon reading the following detailed description of the disclosed embodiment of the present invention, in conjunction with the appended drawings and claims.

DETAILED DESCRIPTION OF THE PREFERRED EMBODIMENT

Figure 1:
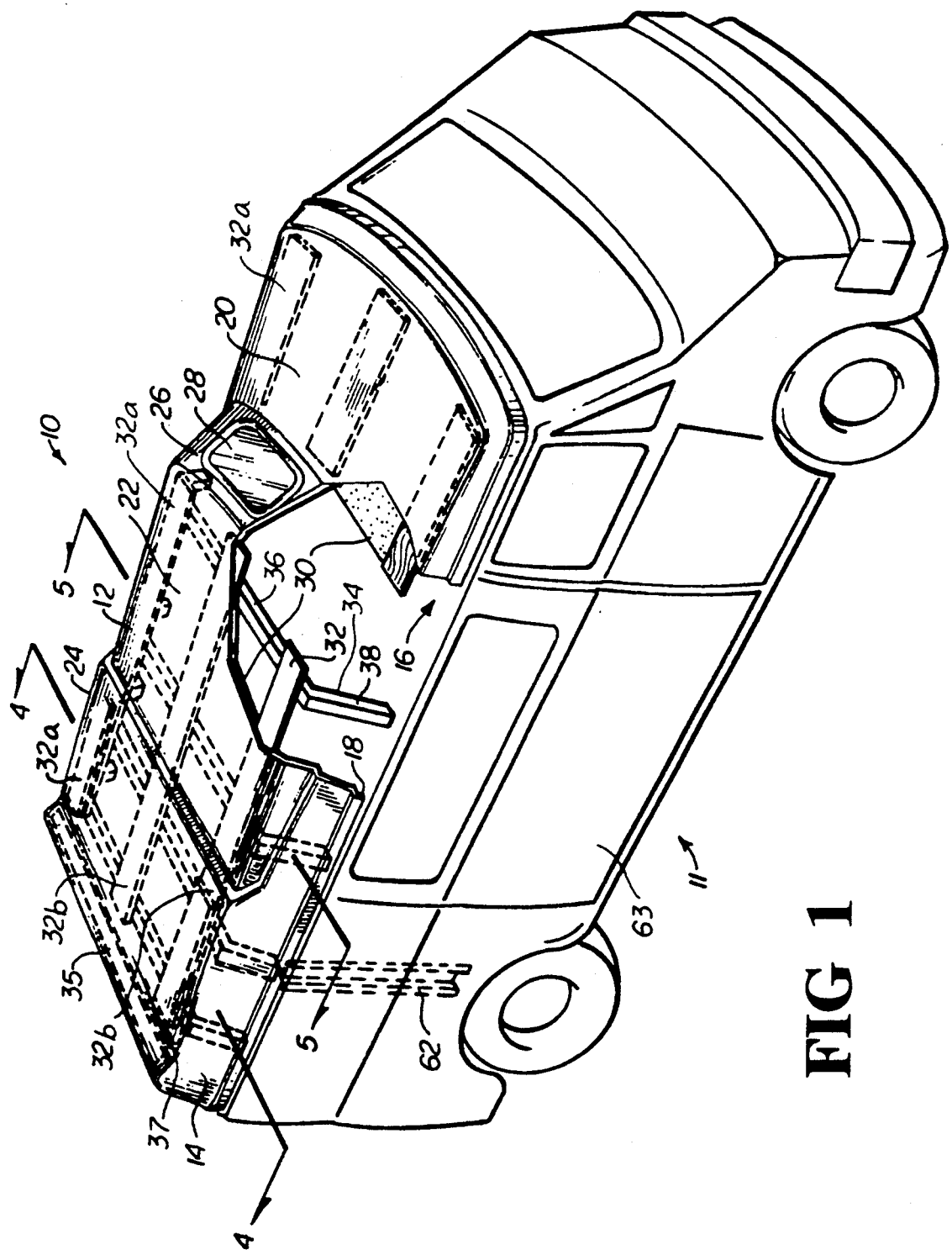
FIG. 1 is a perspective cut-away view of a cap constructed in accordance with a preferred embodiment of the present invention, shown connected to a van to illustrate the environment of the invention.

Referring now in more detail to the drawings, in which the same parts have like identifiers, FIG. 1 is a perspective cutaway view of a cap 10 constructed in accordance with the present invention. The cap 10 is illustrated as mounted on a van 11, thereby showing the environment of the present invention. The cap 10 has a roof member 12, sloping sides 14, and an open bottom 16 defined by the edges 18 of the sides 14. The cap 10 accordingly defines an openended cavity or shell. In the illustrated embodiment, the cap 10 has a forward portion 20, an intermediate portion 22, and a back portion 24. A sloping panel 26 is disposed between the forward portion 20 and the intermediate portion 22. A pair of windows 28 are mounted in the sloping panel 26 (one of the windows is illustrated). The particular ornamental appearance of the cap 10 is not a part of the present invention, and a number of ornamental designs for conversion van caps are known in the art.

Figure 2:
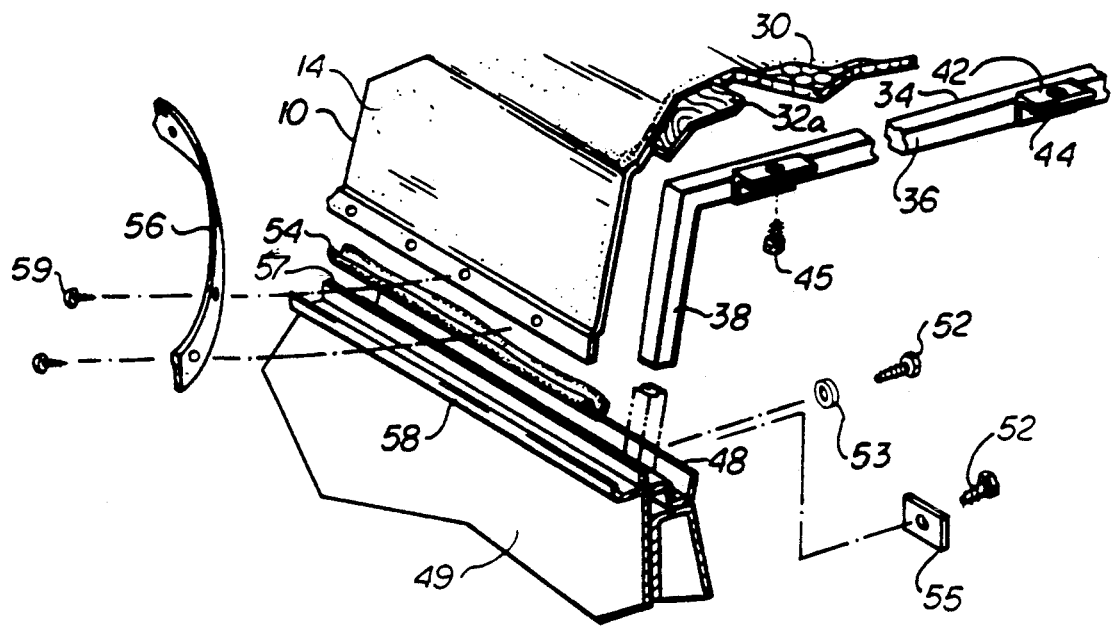
FIG. 2 is an exploded partial view of FIG. 1 showing the connection of the cap to the side wall of the van.
Figure 4:
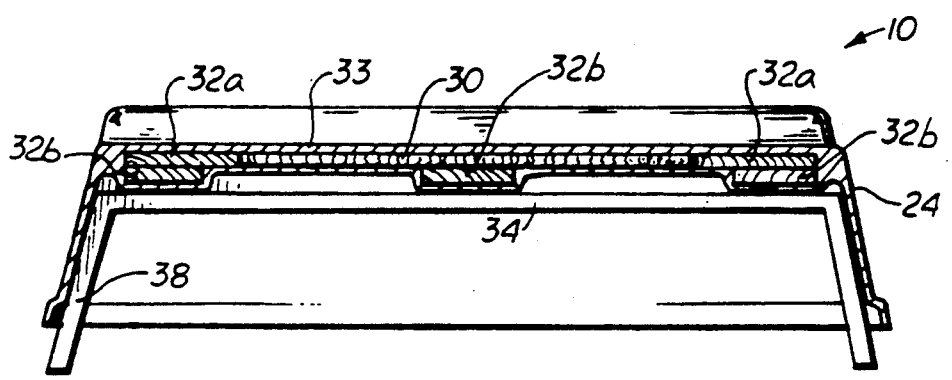
FIG. 4 is a cross-sectional view of the cap 10 illustrated in FIG. 1, taken along line 4—4.
Figure 5:
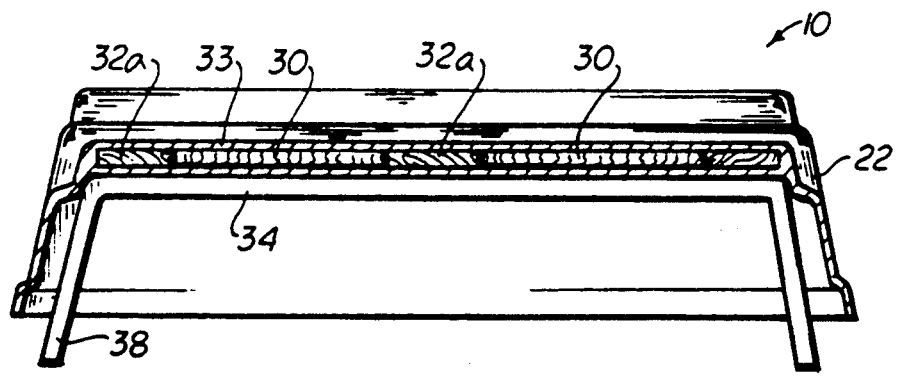
FIG. 5 is a cross-sectional view of the cap 10 illustrated in FIG. 1, taken along line 5—5.

The roof member 12 is made from a plurality of honeycomb-like panels 30 (as best illustrated in FIGS. 2, 4 and 5) and longitudinally disposed cleats 32a and 32b. The panels 30 are preferably made of heavy paperboard and in the illustrated embodiment are five-eighths inch (5/8") thick. In the illustrated embodiment, the cleats 32a are preferably made of five eighths inch (5/8") exterior grade plywood; the cleats 32b are preferably made of three quarter inch (¾") exterior grade plywood. Each panel 30 is disposed between two of the cleats 32. The panels 30 and the cleats 32 are rigidly joined together by a plurality of layers of fiberglass and pure unfilled resin to form the roof member 12.

In the illustrated embodiment, the forward portion 20 is over a driver's area of the van while the intermediate portion 22 and the back portion 24 are over a passenger's area. The back portion 24 is raised slightly with respect to the intermediate portion 22 to create a "step" appearance in the cap. It is preferred, however, that the interior ceiling surface in the passenger area be even to accommodate installation of the interior coverings.

FIGS. 4 and 5 are cross-sectional views illustrating the structure of the back portion 24 and the intermediate portion 22 of the cap 10 over the passenger section of the van 11. To provide a level interior ceiling, the back portion 24 includes additional cleats to bring the ceiling to the same level as in the intermediate area. The back portion 24 has a pair of cleats 32a secured to an initial layer 33 of the fiberglass cloth and resin. The cleats 32a are placed next to the side walls 14. A honeycomb panel 30 is placed between the cleats 32a. Three cleats 32b are spaced apart and disposed longitudinally in the back portion. One cleat 32b is positioned on each of the cleats 32a; one cleat 32b is positioned on the honeycomb panel 30 medial the sides 14.

As illustrated in FIG. 5, the intermediate portion 22 has three spaced-apart cleats 32a secured to the initial layer 33. A pair of honeycomb panels 30 are disposed between the cleats 32a and secured in place by fiberglass cloth and resin, as discussed below.

The structure of the forward portion 20 of the cap 10 is the same as discussed for the intermediate portion 22.

With reference again to FIG. 1, a wood member 35 is positioned in the illustrated embodiment transverse to the sides 14 at a back edge 37 of the back portion 24. The member 35 defines an upswept spoiler on the cap 10. The member 35 is preferably a one-half inch (½") exterior grade plywood.

With reference to FIGS. 1 and 2, the cap 10 further includes a plurality of spaced apart transverse support members 34 each of which define a general U-shaped structural frame. The support member 34 is assembled from a bar 36 disposed transverse in the cap 10 and a pair of legs 38. One leg 38 is attached to each end 40 of the bar 36. A plurality of flanges 42 are secured to the bar 36 and a portion is extended outwardly from the bar. In the illustrated embodiment, the flanges 42 are fixed to the sides of the bar 36. Each flange 42 is positioned in general alignment with one of the cleats 32. A hole 44 is bored through the outwardly extending portion of the flange 42 for receiving a screw 45 therethrough. The bar 36 and the legs 38 are preferably made of three quarter inch (¾") steel tube. A hole 46 is bored laterally through the free end of each leg 38 for receiving a screw.

As best shown in FIG. 2, the roof line of the van 11 is defined by a channel 48 attached to the upper edge of a side wall 49 of the van 11. A screw 52, bolt, or other securing means, is placed through the side wall of the channel 48 and the hole 46 in the leg 38 for securing the cap 10 to the van 11. A lock washer 53 is positioned on the screw 52. In an alternate embodiment, a plate 55 having at least one hole is positioned overlapping the channel 48 and the leg 38. The screw 52 passes through the hole in the plate before connecting to the channel 48 and the leg 38.

A gasket 54 is disposed between the bottom edge 18 of the cap 10 and the roof line of the van. The gasket 54 sits in a drip rail 58 on the outside roof line on the sides of the van. A metal strip 56 is positioned in the drip rail 58 against the sides 14 of the cap. The sides 14 of the cap 10 is overlapped by the metal strip 56 which covers from the bottom edge 18 of the cap 10 upwardly. A plurality of screws 59 are driven through the metal strip 56 to connect the side walls of the van 11 and the cap 10 together.

Figure 3:
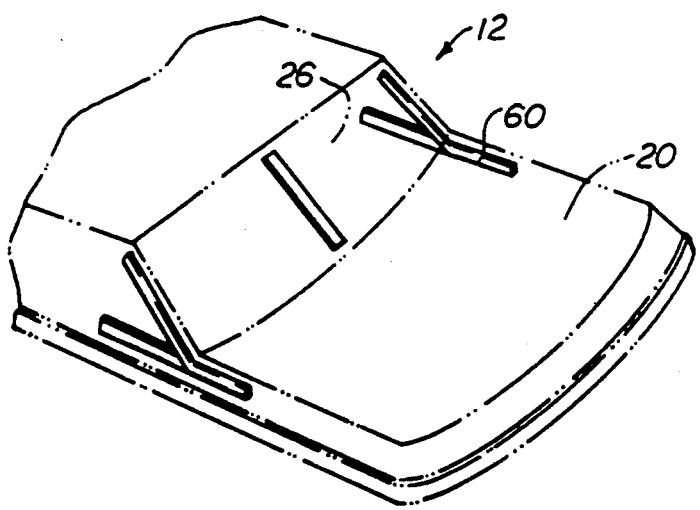
FIG. 3 is a perspective partial view of a cap having panel supports in the roof member illustrated in FIG. 1.

FIG. 3 is a perspective partial view of the roof member 12 showing a support member 60 installed in the junction between the forward portion 20 and the sloping panel 26. The fiber support member 60 is incorporated into the roof 12 by covering with the fiberglass cloth and the resin during the manufacturing process, as discussed below. The member 60 is made from lightweight, high strength fibers. The support member 60 preferably is a length of COREMAT ™ fibers available from West Point Pepperell, Inc., or equivalent. In the illustrated embodiment, the support member 60 is approximately 20 inches long, 1½ inches wide, and 4 mills thick. A second supporting member 61 made from such lightweight, strong fibers is positioned medial the transverse sides of the panel 26.

The cap 10 of the present invention is formed with fiberglass cloth and pure unfilled resin in a mold having the desired ornamental design for the roof line. The use of fiberglass cloth and resin for conversion caps is well-known in the art and the techniques of applying such materials does not form a part of the present invention. With reference to FIGS. 1, 4 and 5, an initial gel coat is applied to the mold to form the outside surface layer 33 of the cap 10. The gel coat includes a tint for the color of the cap. After the gel coat cures, a second layer of chop fiberglass and resin is applied in a thickness of between about 1/8 inch and 3/16 inch. Chop fiberglass is made by passing the fiberglass cloth through a cutter to form strands of approximately 1 inch in length. The resin and the catalyst are sprayed with the chop into the mold. After this second layer is cured, the wood cleats 32a and honeycomb paperboard panels 30 are installed. The backsides of the cleats 32a and the panels 30 are wetted with resin for securing these parts to the second layer of fiberglass. For the back portion 24 in the illustrated embodiment, the cleats 32a are wetted and positioned longitudinally along the sides 14. The honeycomb panel 30 is wetted and then fixed between the cleats. The cleats 32b are wetted and placed spaced-apart on the cleats 32a and on the honeycomb panel medial the sides 14. As discussed above, the cleats 32b provide an interior surface in the back portion 24 even with the interior surface of the intermediate portion 22. A final layer of chop fiberglass and resin is sprayed into the mold to securely connect the cleats and panels together and to make an integral cap. The final fiberglass layer is allowed to cure.

The cap 10 is installed during manufacture of the conversion van 11 as shown in FIG. 2. The van's existing roof is cut off at the roof line above the drip rail 58 on the side of the van. This leaves an upwardly extending flange 57, best seen in FIG. 2. The gasket 54, typically a butyl rubber material, is positioned around the top edge of the van 11. The gasket 54 is a seal which prevents water from leaking between the cap 10 and the top edge of the van 11. The cap 10 is placed on the gasket 54. The bottom edge 18 of the cap 10 sits just above the drip rail 58 against the upwardly extending flange 57 of the van side 49. The metal strip 56 is placed around the periphery of the van. The metal strip 56 sits in the bottom of the drip rail 58 and overlaps the side of the cap 10. The plurality of screws 59 are driven through the metal strip 56, the side 14 of the cap 10, and into the side of the van 11, to join the cap and the van together.

With reference to FIGS. 1 and 2, the transverse support members 34 are installed. It is preferred that at least one of the transverse support members 34 be positioned above a side support rib 62 of the van 11, such as near the door 63. The free ends of the legs 38 are positioned in the channel 48. The support member 34 is joined to the cap 10 by driving screws 45 through the holes 42 in the flanges 40 on the bar 36. The screws 45 enter the cleats 32a and 32b to rigidly join the bar 36 to the cap 10. Each of the legs 38 is secured to the channel 48 by driving one of the screws 52 through the channel 48 and into the leg 38. Finally, a sealant, such as a silicon caulk, is placed between the support member 34 and the interior surface of the cap 10 to reduce vibration.

An improved cap of the illustrated embodiment was tested using the Federal Motor Vehicle Safety Standard (FVMSS) No. 220 "School Bus Rollover Protection" test. In this test, a force equal to 1.5 times the unloaded vehicle weight is applied to the roof of a vehicle's body structure. The force is applied through a force application plate which is five inches longer and five inches wider than the van. The test is passed by the van if the downward vertical movement at any point on the application plate is five and one eighth inches (5 1/8") or less. Also, the doors must be capable of opening during full application of the force and after release of the force.

The test was performed using a Chevrolet Model 20 van having a curb weight of 5065 pounds. The force application plate was a flat, rigid steel plate weighing 1.54 times the van's curb weight, or 7,800 pounds. This was approximately 200 pounds greater than that required by the test. The force application plate was approximately 16 feet long and 9 feet wide. These dimensions exceed the FMVSS 220 standard by approximately 10 inches in length and 23 inches in width. The plate downward movement was measured by string potentiometers attached at four locations corresponding to the FMVSS 220 standard of a plate five inches longer and five inches wider than the van length and width dimensions. The van length was measureed from the rear doors to the bottom of the windshield, and the cap width was measured between the van sides at the widest point. The van measured 14 feet, 9 inches by 6 feet, 7¾ inches. The centerline of the force application plate was aligned with the centerline of the van and the plate was lowered onto the cap of the van. When 500 pounds of force was applied, the potentiometers were set to zero. The remaining weight of the force plate was applied to the van. After approximately 85 seconds, the force plate was lifted from the van. After inspection the test was repeated with the force plate ballasted to 10,000 pounds.

The van with the improved cap met the requirements of the FMVSS 220 standard with no significant damage to the structure when a load of 1.54 times the curb weight of the vehicle was applied. The rightside rear passenger door did not initially open when the load was applied because of a small protrusion of metal from the roof edge which interfered with the top of the door, preventing it from swinging open. The metal protrusion was supposed to be removed during installation of the cap. After removed of the protrusion, the door opened without interference. Table 1 reports the maximum force plate movement as recorded by the four potentiometers.

TABLE 1

| Maximum Force Plate Movement | |
| --- | --- |
| Left Front | 1.9 inches |
| Right Front | 2.6 inches |
| Left Rear | 0 inches |
| Right Rear | 0.4 inches |

The test was repeated with the force application plate ballasted to 10,000 pounds. The cap was capable of supporting the load; however gradual downward movement of the force plate was still ocurring when the plate was lifted after 85 seconds. The rightside rear passenger door would not open with the load applied because of the deflection in the roof structure. Table 2 reports the maximum force plate movement during the second test. The measurements however can not be directly related to the FMVSS 220 maximum allowable downward movement because the string potentiometers were re-zeroed during the second test.

TABLE 2

| Maximum Force Plate Movement | |
| --- | --- |
| Left Front | 3.0 inches |
| Right Front | 3.2 inches |
| Left Rear | 0 inches |
| Right Rear | 0 inches |

Accordingly, the present invention provides an improved cap which attaches to the metal channel at the roof line of a conversion van. The cap is readily manufactured and installed on a van for providing a cap having increased strength.

The principles, preferred embodiments and modes of operation of the present invention have been described in the foregoing specification. The invention is not to be construed as limited to the particular forms disclosed because these are regarded as illustrative, rather than restrictive. Moreover, variations and changes may be made by those skilled in the art without departing from the spirit of the invention as described by the following claims.

What is claimed is:

1. A cap for attachment to a metal channel defining the perimeter of an open-top vehicle at its roof line, comprising:

a shell comprising a roof member, depending sides, and an open bottom to define an interior cavity;

the roof member comprising:

a plurality of honeycomb-like paperboard panels; and a plurality of longitudinally disposed, spaced-apart cleats, each of the panels disposed between two of the cleats;

a plurality of transverse support members spaced-apart in the interior cavity of the shell, each member comprising a transverse bar and a pair of legs, one leg depending from each end of the transverse bar to define a general U-shape, the transverse bar rigidly connected to the roof member;

a flange extending from each transverse bar in alignment with one of the cleats: and a screw passing through a hole in the flange to rigidly connect the transverse support member to the roof member.

2. The cap for attachment to a metal channel defining the perimeter of an open-top vehicle at its roof line, as recited in claim 1, further comprising a plate connected to each leg so that a side of the metal channel is sandwiched between the plate and the leg.

3. The cap for attachment to a metal channel defining the perimeter of an open-top vehicle at its roof line, as recited in claim 1, wherein the paperboard panels and the cleats are rigidly joined in the roof member by a plurality of layers of fiberglass and resin.

4. The cap for attachment to a metal channel defining the perimeter of an open-top vehicle at its roof line as recited in claim 1, further comprising a sealant disposed between the transverse bar and the roof member.

5. A cap for attachment to a metal channel defining the perimeter of an open-top vehicle at its roof line, comprising:

a shell comprising a roof member, depending sides, and an open bottom to define an interior cavity;

the roof member comprising:
   a plurality of honeycomb-like paperboard panels; and
   a plurality of longitudinally disposed, spaced-apart cleats, each of the panels disposed between two of the cleats, the paperboard panels and cleats rigidly joined together by a plurality of layers of fiberglass and resin;

a plurality of transverse support members, each defining a general U-shape and spaced-apart in the interior cavity of the shell and comprising:

a transverse bar;

a flange plate extending from the transverse bar in general alignment with one of the cleats and having a hole for receiving a screw for rigidly connecting the support member to the roof member; and a pair of legs, one leg depending from each longitudinal end of the transverse bar;

a free end of each leg received by the metal channel;

a plate disposed on an outside surface of the metal channel in alignment with one of the legs; and a screw received through the plate, the metal channel, and the leg for rigidly connecting the cap to the metal channel.

6. The cap for attachment to a metal channel defining the perimeter of an open-top vehicle at its roof line, as recited in claim 5, further comprising a sealant interposed between the transverse bar and the roof member for reducing vibration of the support member.

* * * * *